(12) United States Patent
Zambetti et al.

(10) Patent No.: US 7,541,789 B2
(45) Date of Patent: Jun. 2, 2009

(54) COMMON SHARING BUS CONTROL CIRCUIT FOR SIGNAL REGULATION MODULES

(75) Inventors: Osvaldo Zambetti, Milan (IT); Alessandro Zafarana, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 371 days.

(21) Appl. No.: 11/236,250

(22) Filed: Sep. 27, 2005

(65) Prior Publication Data
US 2006/0139976 A1    Jun. 29, 2006

(30) Foreign Application Priority Data
Sep. 27, 2004   (EP)   ................................. 04425718

(51) Int. Cl.
G05F 1/40   (2006.01)

(52) U.S. Cl. .................................................. 323/282

(58) Field of Classification Search ................ 323/271, 323/273, 274, 282, 284, 285, 351, 272
See application file for complete search history.

(56) References Cited

U.S. PATENT DOCUMENTS

| 5,804,958 | A | * | 9/1998 | Tsui et al. ................ 323/313 |
| 6,414,470 | B1 | | 7/2002 | Liu et al. ................... 323/272 |
| 6,515,460 | B1 | | 2/2003 | Farrenkopf ................ 323/272 |
| 6,670,794 | B1 | | 12/2003 | Wang et al. ................ 323/213 |
| 7,088,082 | B2 | * | 8/2006 | Jung .......................... 323/275 |
| 7,170,267 | B1 | * | 1/2007 | McJimsey .................. 323/271 |
| 2002/0027476 | A1 | * | 3/2002 | Soldavini ................... 330/288 |
| 2002/0135338 | A1 | | 9/2002 | Hobrecht et al. ........... 323/272 |

FOREIGN PATENT DOCUMENTS

WO    03/085476    10/2003

* cited by examiner

Primary Examiner—Adolf Berhane
(74) Attorney, Agent, or Firm—Lisa K. Jorgenson; Allen, Dyer, Doppelt, Milbrath & Gilchrist, P.A.

(57) ABSTRACT

The control circuit is for a current sharing bus integrated in signal regulator modules, particularly voltage regulator modules (VRM), the circuit being of the Average Program (AP) type. The circuit includes a voltage regulator module, including an operational transconductance amplifier, a first current generator, connected to a first input terminal of the operational transconductance amplifier, a second current generator connected to a second input of the operational transconductance amplifier. The operational transconductance amplifier is directly driven by currents Ii generated by the first current generator and second current generator.

13 Claims, 7 Drawing Sheets

US 7,541,789 B2

COMMON SHARING BUS CONTROL CIRCUIT FOR SIGNAL REGULATION MODULES

FIELD OF THE INVENTION

The present invention relates to a current sharing bus control circuit, particularly for signal regulator modules. The invention relates more particularly, but not exclusively, to a control circuit wherein the regulator modules are voltage-fed (Voltage Regulator Module).

BACKGROUND OF THE INVENTION

As it is well known, the development of the electric features of PC, WORKSTATION and SERVER processors obliges manufactures to look for new approaches to meet the requirements imposed by corresponding central processing units, commonly called CPUs: high supply voltage precision, particularly +/−0.8% in the steady state condition and +/−3% in the transient condition. Nevertheless supply voltages fall to 1.1V, load currents increase up to 100 A with fronts of 100 A/µs and an efficiency being higher than 80% is required. In this perspective, it is thus known to use a voltage regulator module, hereafter simply indicated with module VRM, associated to each microprocessor in each SERVER or WORKSTATION.

Aiming at increasing performances and ensuring the integrity of the whole system wherein operation occurs, it is also known to use several modules VRM, connected in parallel and having all input supply terminals connected to each other and all output voltage terminals connected to each other, thus forming a single multi-module supply unit.

But such a parallel architecture requires a convenient distribution control of the currents flowing in parallel modules VRM, in order to allow the total load current to be equitably distributed among the modules, i.e. that each module VRM carries a current corresponding to the current required at the output split by the number of modules.

A known control technique being used to reach this aim is the so-called current sharing technique. This technique exploits a current sharing bus, common to all modules VRM of an architecture, suitable to provide the signals required by each module VRM in order to change the output current thereof, in order to make it equal to the current of the other modules connected thereto. This Current Sharing Bus will be briefly indicated hereafter with "CSB".

Several methods are known in the art to control the CSB and the relevant current sharing outputted by the N modules connected thereto. A first known method to control the CSB operates at the system level, i.e. for all architecture modules and it is known as Average Program (AP) control. This method is based on the comparison between the average current delivered by the N modules VRM and the current delivered by a single module. This method is described for example in the U.S. Pat. application No. 2002/0073347 A1 dated Jun. 13, 2002, in the name of the same applicant.

The corresponding circuit is implemented using discrete components and it is shown in FIG. 1, in the particular case of a multi-module architecture 1 having a parallel configuration of only two modules 2, indicated with VRM1 and VRM2. Each module 2 has an input terminal IN receiving a same input voltage signal $V_{IN}$, it outputs a single current Ii [i=1,2] and it has an output terminal in common with the other modules, in correspondence with an output node OUT wherein an output signal $V_{OUT}$ occurs. The sum $I_{OUT}$ of the currents Ii is a current value generated by the multi-module architecture 1.

In particular, a first module VRM1 comprises two operational amplifiers OP1 and OP2 with respective inverting terminals N1 and N2, and non-inverting terminals P1 and P2. This first module VRM1 also comprises a PWM signal generator, indicated with PWM1 receiving the input signal $V_{IN}$ and a signal U1 outputted by the amplifier OP1. The generator PWM1 is output-connected to the inverting terminal N1 of the operational amplifier OP1, by means of the node X1, and to the inverting terminal N2 of the operational amplifier OP2, by means of the node X2. A reference voltage $V_{REF}1$ is added to an output signal U2 of the operational amplifier OP2 in an adder node S1, connected to the non-inverting terminal P1 of the operational amplifier OP1.

The multi-module architecture 1 of FIG. 1 also comprises a second module VRM2, structurally identical to the first module VRM1. In particular, the second module VRM2 has a PWM signal generator, indicated with PWM2, two operational amplifiers OP3 and OP4 with respective inverting terminals N3 and N4 and non-inverting terminals P3, P4, two circuit nodes X3, X4 and an adder node S2.

The non-inverting terminal P2 of the operational amplifier OP2 of the first module VRM1 is connected to the non-inverting terminal P4 of the operational amplifier OP4 of the second module VRM2, by means of the CSB. In the first module VRM1, a resistor R1 is interposed between the node X2 and the CSB. In the second module VRM2, a resistance R2 is interposed between the node X4 and the CSB. In this node the CBS has a voltage $V_{CSB}$ corresponding to the average of the currents I1 and I2 delivered by the modules VRM1 and VRM2.

Therefore it results that the current value $I_{OUT}$ outputted by the output terminal OUT of the multi-module architecture 1 is given by the sum of the currents I1 and I2 outputted by the single modules. Moreover, the common voltage Vout of the output terminal OUT of the multi-module architecture 1 is equal to Vout.

The Average Program control method, implemented by the multi-module architecture 1, allows a completely linear and accurate regulation of the currents Ii delivered by each module comprised therein to be obtained.

Although advantageous under several aspects, this embodiment has several drawbacks, particularly when one or more modules VRM enter a fault condition. The CSB detects a lower current than the one required by a load connected to the architecture 1 and thus the current sharing control fails.

FIG. 2 shows a detail of the circuit of FIG. 1, enlarged to N parallel modules VRM, wherein one of the modules, particularly a first module VRM1 is supposed to enter a FAULT condition.

In this situation, the CSB voltage is given by:

$$V_{CSB} = \frac{0 + I_2 + I_3 + \ldots + I_N}{N} * R$$

the current I1 of the module VRM1, which is supposed to be in the FAULT condition, being void and not contributing to the $V_{CSB}$ computing. The resulting voltage $V_{CSB}$ is thus lower than the one required by the load with a subsequent failure of the current sharing control performed by the multi-module architecture 1.

The only approach remaining open to avoid this problem is to release the module in FAULT from the architecture, by inserting between the CSB and the module itself a switch SW, controlled by a signal, monitoring the correct operation of each module. The switch SW is inserted between the operational amplifier OP2 and the CSB and it is controlled by a control signal generated by a failure detection block 3.

To manage the failure conditions or fault, each module VRMi is then associated to a switch Swi (i=1 .. n). The detail of a module VRM with a switch SW is shown in FIG. 3 wherein, to identify components corresponding to the ones shown in FIG. 1, the same reference labels have been used.

The insertion of this switch SWi ensures the current sharing control, but it also involves an increase in the area occupation on the board wherein the module VRM is integrated, with a subsequent increase in the application cost, making the use thereof unprofitable.

Other known methods to control the CSB use embodiments being integrated in each single module VRM and they are known as active CSB control methods. These active CSB methods, integrated at the single module level, generally use Master & Slave architectures.

An embodiment of a first Master & Slave architecture for the active CSB control, so-called "Direct Master" (DM), is schematically shown in FIG. 4 and globally indicated with 4. In particular, by using this type of architecture 4, one of the modules VRM acts as a reference module. As it has been seen for the multi-module architecture 1, the multi-module architecture 4 also comprises several modules VRM connected to each other between an input terminal IN and an output terminal OUT. In particular, the input terminal IN receives a common input voltage signal $V_{IN}$, and the output terminal OUT a common output signal $V_{OUT}$. An output current Ii is outputted by each module whose sum $I_{OUT}$ is the current value generated by the multi-module architecture 4.

FIG. 4 particularly shows a parallel configuration of only two modules VRM3 and VRM4, configured according to a direct master architecture, having a first module VRM3 acting as a reference module. The first module VRM3 thus comprises an operational amplifier OP5 having an inverting terminal N5 and a non-inverting terminal P5. This first module VRM3 also comprises a signal generator PWM3 receiving the input signal $V_{IN}$, and a signal U5 outputted by the amplifier OP5. The inverting terminal N5 of the operational amplifier OP5 is connected to the generator PWM3, by means of a node X5, while the non-inverting terminal P5 of the operational amplifier OP5 is connected to a first reference voltage $V_{REF}1$.

The multi-module architecture 4 also comprises a second module VRM4 comprising an error amplifier OP6 and a sharing regulation amplifier OP7 having respective inverting N6 and N7 and non-inverting P6 and P7 terminals. This second module VRM4 also comprises a signal generator PWM4 receiving the input signal $V_{IN}$, and a signal U6 outputted by the error amplifier OP6. The signal generator PWM4 is output-connected to the inverting terminal N6 of the error amplifier OP6 and to the inverting terminal N7 of the sharing regulation amplifier OP7 by means of a node X6. A second reference voltage $V_{REF}2$ is added to an output signal U7 of the sharing regulation amplifier OP7 in an adder node S3 connected to the non-inverting terminal P6 of the error amplifier OP6. The non-inverting terminal P7 is connected to the node X5 by means of the CSB.

The multi-module architecture 4 differs from the architecture 1 of FIG. 1 by the structure of the respective first modules VRM1 and VRM3. The first module VRM3 is a master module and it controls the CSB, providing a current reference signal I3 to all the other architecture modules. This approach has the advantage of being simple to realize and of ensuring a linear regulation.

Unfortunately, also this approach has a major drawback. In fact, in case of fault of the first master module VRM3, also the remaining modules VRM enter the FAULT condition, making the current sharing control fail and turning the whole architecture off. To solve this problem, it is possible to use an alternative embodiment of the multi-module architecture being so-called Automatic Master (AM). In this architecture, the module VRM with the highest delivered current acts as a master and it controls the CSB, so that the remaining modules behave as Slaves.

An example of this architecture is shown in FIG. 5, globally indicated with 5, wherein, to identify components corresponding to the ones shown in FIG. 4, the same reference labels have been used. As shown in FIG. 5, the first module VRM3 comprises a first diode D1 inserted between the output terminal thereof and the CSB. Therefore, the first diode D1 is thus interposed between the node X5 and the non-inverting terminal P7 of the sharing regulation amplifier OP7. Similarly, the second module VRM4 comprises a second diode D2 inserted between the CSB and the output terminal thereof. In particular, the second diode D2 connects the node X6 to the non-inverting terminal P7 of the sharing regulation amplifier OP7 of the second module VRM4. The two diodes D1 and D2 are generally realized by means of operational amplifiers in the "Super-Diode" configuration.

In case of "FAULT" of a module VRM, the current of this module is void, and the corresponding diode is reverse biased causing an automatic release of the module from the CSB control which is continuously driver by a Master module, i.e. the module having the highest output current. Therefore, the problem of a module Fault in a master & slave configuration is solved.

But also this approach has some drawbacks just caused by the presence of diodes D1 and D2. In fact, a known major problem affecting this type of architecture is indicated with the term "chattering" and it includes the lack of stabilization of the module current which keeps on oscillating around the working point as shown in FIG. 6 because of the diodes. The current of each module oscillates at a frequency and at an oscillation amplitude being determined by the CSB band and the loop gain respectively. The CSB loop comprising the sharing regulation amplifier OP7, the error amplifier OP6 and the signal generator PWM4.

To remove the "Chattering" problem it is necessary to insert an offset generator between the "Master" module and the "Slave" modules, as schematically shown in FIG. 7. In particular, this figure shows a multi-module architecture 7 of the Automatic Master with offset type, wherein an offset generator OFS is inserted between the non-inverting terminal P7 of the sharing regulation operational amplifier OP7 of the second module VRM2 or slave module and the node X6. The first module VRM3 or master module VRM generates a current Io_master, while the slave module VRM4 generates a current Io_slave. The trend in time of the two currents is shown in FIG. 8.

But it should be noted that the insertion of the offset generator makes a higher tolerance for the currents delivered by the modules necessary, with a subsequent worsening of the control precision, realized by the multi-module architecture 7.

FIG. 9 shows a possible implementation on an integrated circuit of an Automatic Master active CSB architecture equipped with four PINs for the external components. This implementation is described in the U.S. Pat. No. 6,642,631 B1 of the Applicant, published on Nov. 4, 2003. In FIG. 9, the master module VRM4 of FIG. 7 is regulated by a control circuit 9. This circuit comprises a sensing current amplifier OP8 in cascade with a sharing bus amplifier OP9. The sensing current amplifier OP8 is connected by means of its non-inverting terminal P8 to a reference voltage value Vref and, by means of the inverting terminal N8 to a current generator $I_{SENSE}$ by means of a circuit node $N_{FB}$ (first PIN).

A resistor $R_{SHARE1}$ is outside the circuit 9, playing the role of programming the highest CSB current value. This resistor $R_{SHARE1}$ is connected to the circuit node $N_{FB}$ as well as to a node $N_{OUT}$ (second PIN) connected in turn to an output node X8 of the sensing current amplifier OP8 and to a controlled circuit 10, substantially corresponding to the master module VRM4 of FIG. 7. In the control circuit 10, to identify components being equal or similar to the ones of the master module VRM4, the same reference numbers will be used. The node $N_{FB}$ is connected by means of the offset generator OFS to the inverting terminal N7 of the sharing regulation amplifier OP7.

The node X8 is connected to the non-inverting terminal P9 of the sharing bus amplifier OP9. The inverting terminal N9 of this amplifier is connected to a circuit node X9, connected in turn to a node $N_{CSB}$ (third PIN) as well as to a circuit node X10 being interposed between the diode D2, which allows the conduction of the signal outputted by the sharing bus amplifier OP9, and the non-inverting terminal P7 of the sharing regulation amplifier OP7. The sharing regulation amplifier OP7 has an output U7 connected to the error amplifier OP6, shown in FIG. 4, but not shown in FIG. 9.

A similar approach to the one shown in FIG. 9 is shown in FIG. 10 and it shows the case wherein the signal coming from the current sense is already a voltage signal. In this figure a resistor $R_{SHARE2}$ has been thus added, being coupled to the already-existing resistor $R_{SHARE1}$ connected to a ground supply voltage GND, the rest of the circuit being unchanged.

The implementation on an integrated circuit of the Automatic Master active CSB architecture described in the two FIGS. 9 and 10 thus requires the use of as much as four pins, identified by the nodes $N_{FB}$, $I_{OUT}$, $N_{CSB}$ e $N_{SHARE}$, to be coupled to the external components, and as much as three operational amplifiers OP7, OP8, OP9 as well as an external resistor $R_{SHARE1}$, being capable to program the CSB threshold. It has also a systematic error on the current sharing between the modules due to the insertion of the offset generator OFS, being necessary to remove the chattering problem of the current Ii delivered by the different modules VRM. This implementation, although not being simple to realize and although having evident limitations and drawbacks, is the only integrated solution presently available in the market, known with the name of ON Semiconductor CS5305.

The technical problem underlying the present invention is to provide a CSB control circuit having such structural and functional features as to allow the total load current to be equitably distributed among the modules VRM, overcoming the limitations and/or drawbacks still penalizing the prior art embodiments.

SUMMARY OF THE INVENTION

The present invention uses a current and not a voltage as a sensing signal for the distribution. Based on this approach the technical problem is solved by a control circuit of the present invention.

The features and advantages of the circuit according to the invention will be apparent from the following description of an embodiment thereof given by way of non limiting example with reference to the attached drawings.

DETAILED DESCRIPTION OF THE PREFERRED EMBODIMENTS

Figure 11:
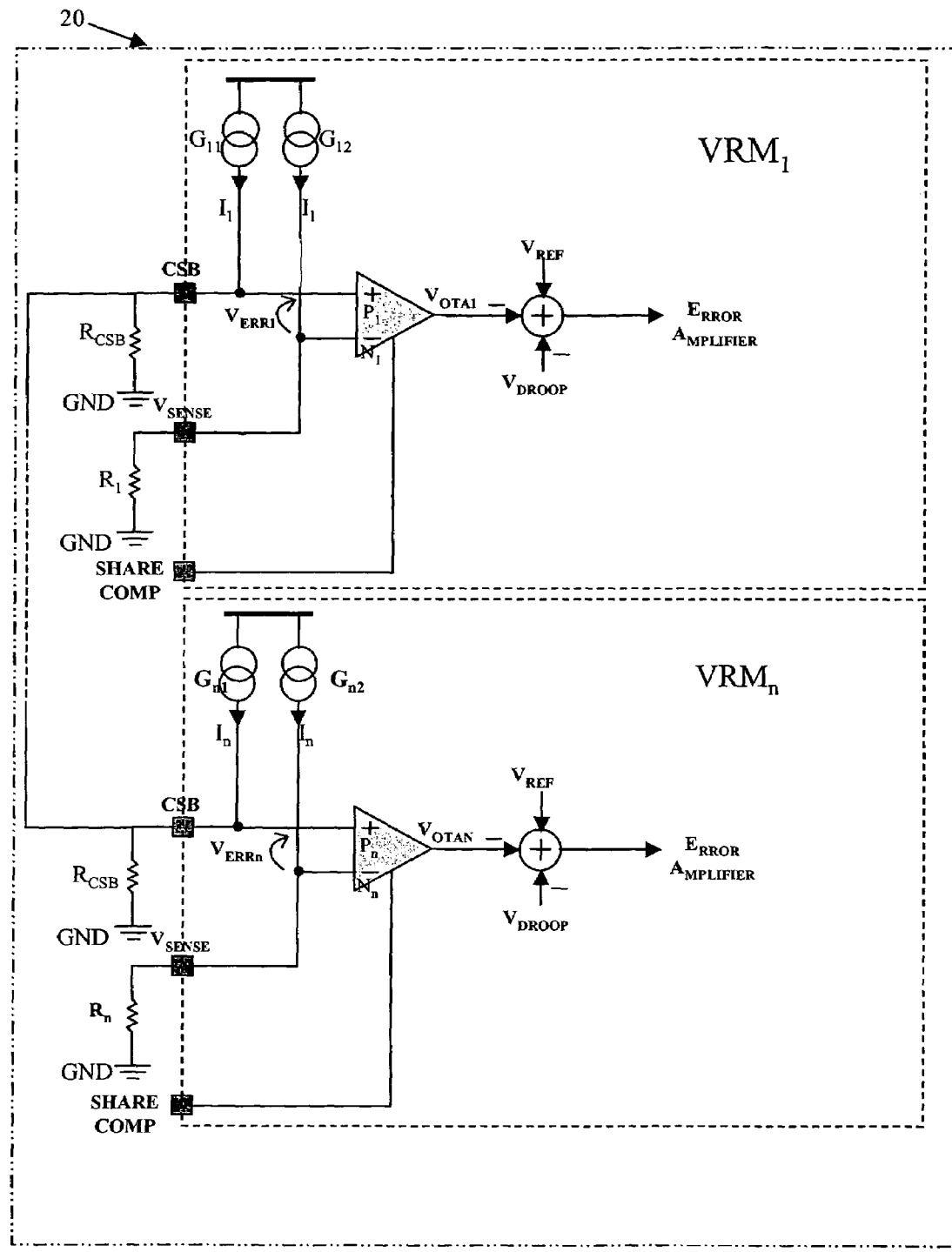
FIG. 11 shows an architecture for implementing an Average Program (AP) control method for two parallel modules VRM, realized according to the present invention.

With reference to the drawings, FIG. 11 shows, globally indicated with 20, a multi-module architecture for implementing an Average Program (AP) method for controlling a current sharing bus (CSB), for modules VRM, realize according to the present invention. In this architecture, the CSB control is integrated in each single module VRM.

Figure 12:
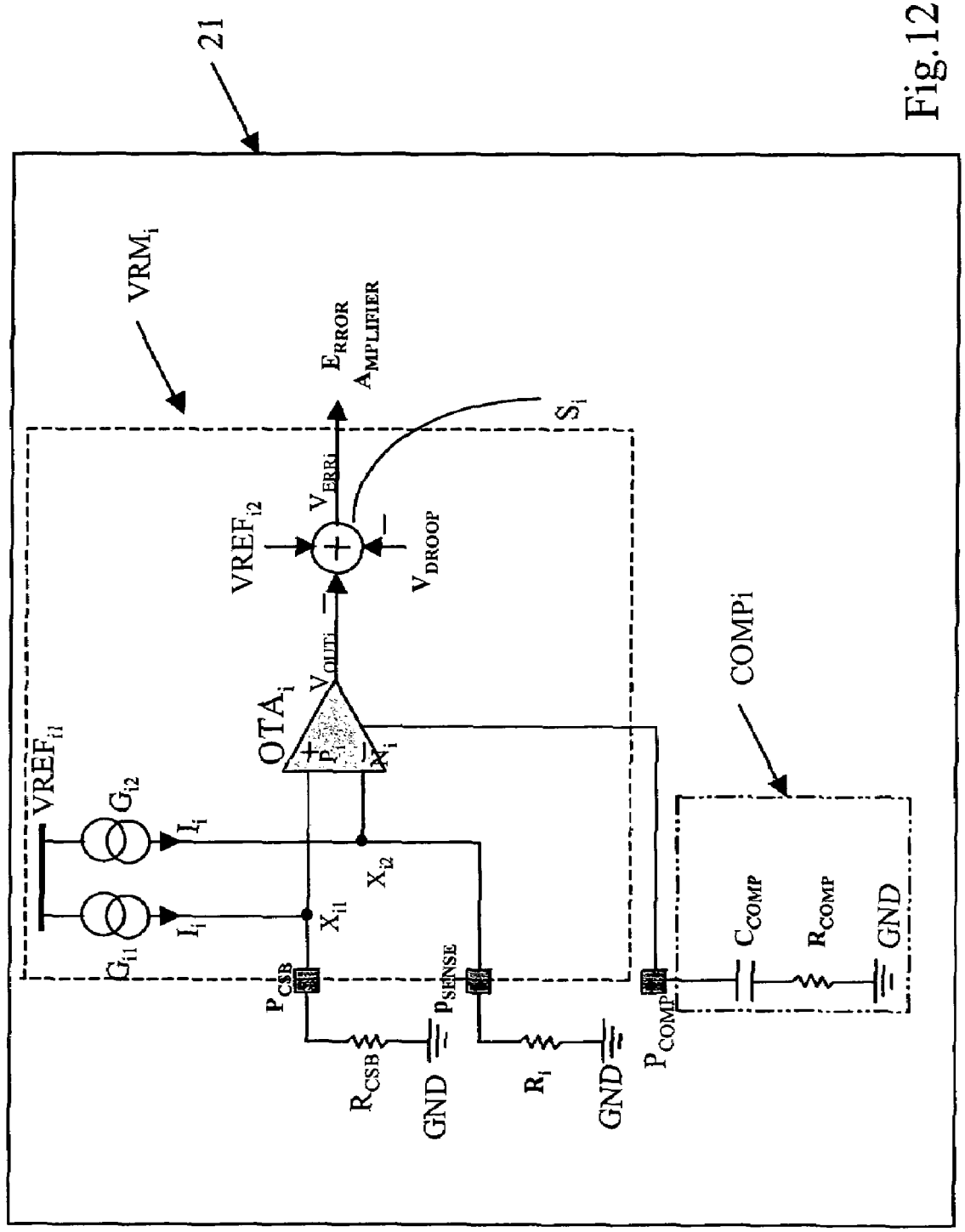
FIG. 12 shows a circuit for implementing an Average Program (AP) control method for a module VRM, according to the present invention.

FIG. 12 shows a circuit 21 for controlling the CBS of a voltage regulator module VRMi, the latter being connected to a compensation circuit COMP, according to the present invention. Several modules VRMi are arranged in parallel in the multi-module architecture 20, wherein compensation circuits COMPi have not been inserted for convenience.

The module $VRM_i$ comprises a first generator $G_{i1}$ and a second generator $G_{i2}$, having the same current value $I_i$, being both connected to a first voltage reference $VREF_{i1}$. The first generator $G_{i1}$ is connected, by means of a node $X_{i1}$ to the non-inverting terminal $P_i$ of an operational transconductance amplifier $OTA_i$. This terminal is connected to a second reference voltage, particularly a ground GND, by means of an external resistor $R_{CSB}$. A PIN $P_{CSB}$ comprised between the node $X_{i1}$ and the resistor $R_{CSB}$, is kept at the same potential as the other PINs $P_{CSB}$ of another/or of other parallel modules by means of a direct connection, the value of this potential being the value of the voltage calculated on the Current Sharing Bus.

The second current generator $G_{i2}$ is connected, by means of a node $X_{i2}$ to the inverting terminal $N_i$ of the operational transconductance amplifier $OTA_i$. This terminal is connected to a second reference voltage, particularly a ground GND, by means of an external resistor $R_i$. A PIN $P_{SENSE}$ allows a voltage value $V_{SENSE}$ of the module $VRM_i$ to be extracted. In an adder node $S_i$, a voltage $VOUT_i$, outputted from the operational transconductance amplifier $OTA_i$, is added to a compensation voltage VDROOP and to a third voltage reference $VREF_{i2}$, particularly the main controller signal. A signal $Verr_i$, generated by the adder node $S_i$, is then sent to an error amplifier not shown in the figure, being it conventional.

The compensation voltage VDROOP is an inner signal in the control circuit 21, allowing the output thereof to be changed according to the current required (function called "droop function"). The droop function is not always required. In this case, the signal Vdroop does not exist, i.e. the value thereof is null. The compensation circuit COMP is a circuit RC comprising a resistor $R_{COMP}$ and a capacitor $C_{COMP}$, being connected in series, interposed between the operational transconductance amplifier $OTA_i$ and the second voltage reference GND.

Advantageously, according to the invention, by changing the parameters R and C of the compensation circuit COMP, it is possible to program the CSB loop band, thus adapting the system to any module VRMi. Advantageously according to the invention the circuit requires the use of a single operational transconductance amplifier, indicated in the figure with $OTA_i$. Thanks to this amplifier, (and to the compensation circuit COMP) the CSB keeps a high gain at low frequency (integrator) and a low gain at high frequency. The first condition is essential to ensure the result accuracy, while the second is needed not to interfere with the control system anyhow existing in the module $VRM_i$.

Figure 2:
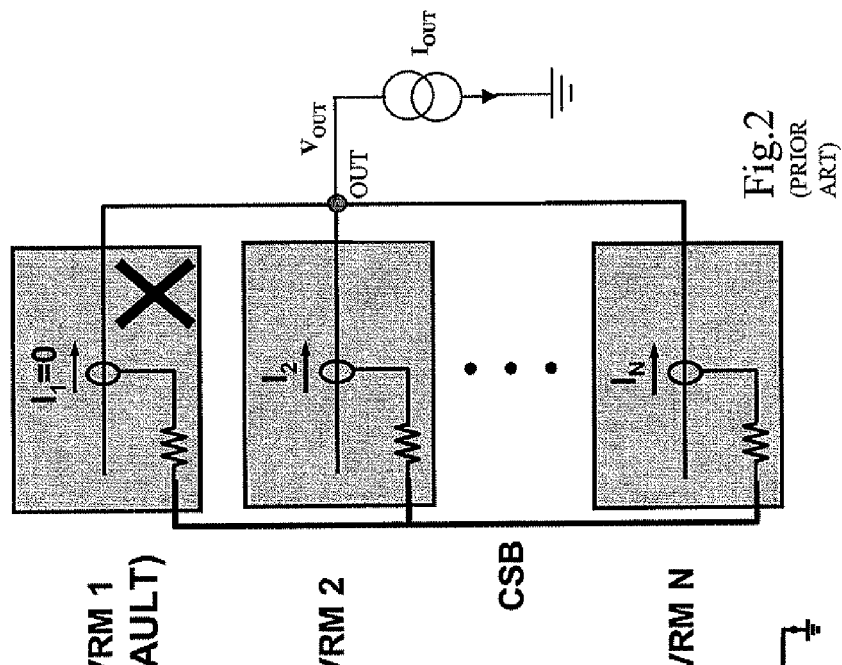
FIG. 2 shows a detail of the circuit of FIG. 1, extended to N parallel modules VRM, in a particular operating condition.
Figure 1:
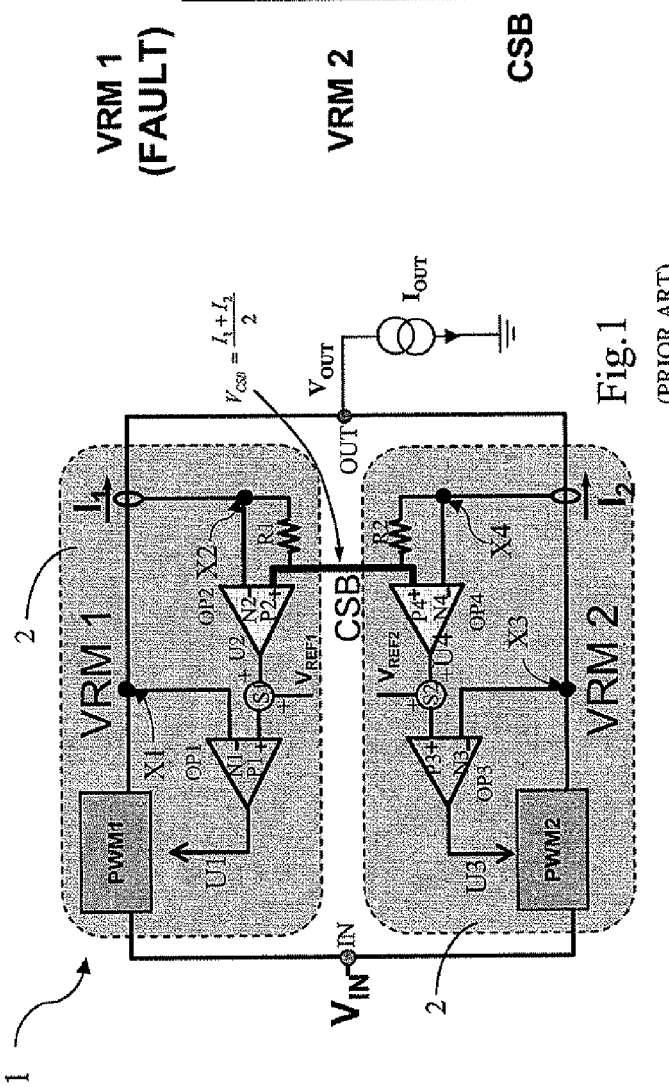
FIG. 1 schematically shows an architecture for implementing a Average Program (AP) control method with two parallel modules VRM, realized according to the prior art.
Figure 3:
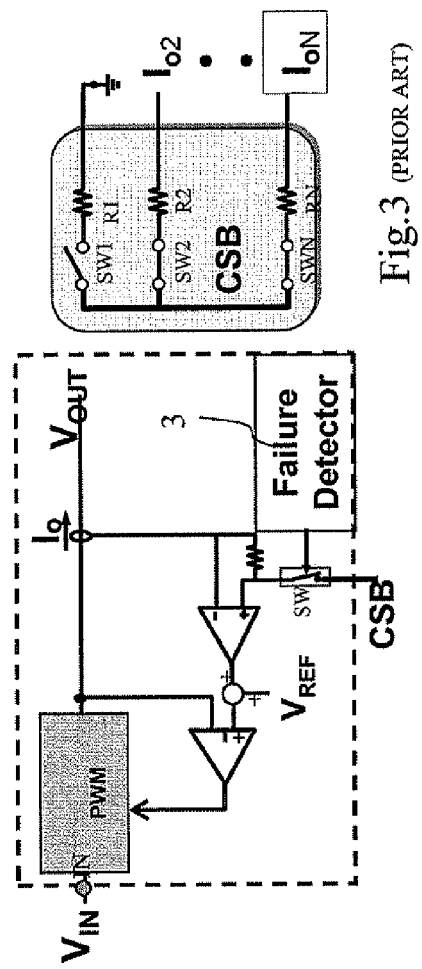
FIG. 3 shows a module VRM with a switch SW, according to the prior art.
Figure 5:
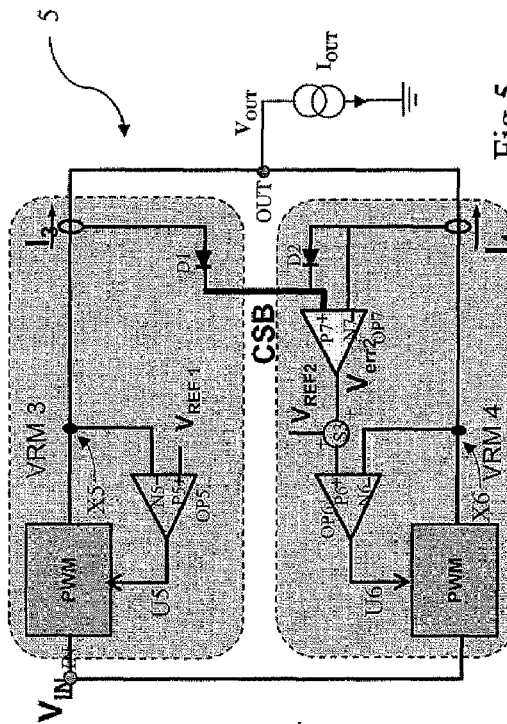
FIG. 5 schematically shows an architecture for implementing a master & slave Automatic Master (AM) control method for two parallel modules VRM, realized according to the prior art.
Figure 4:
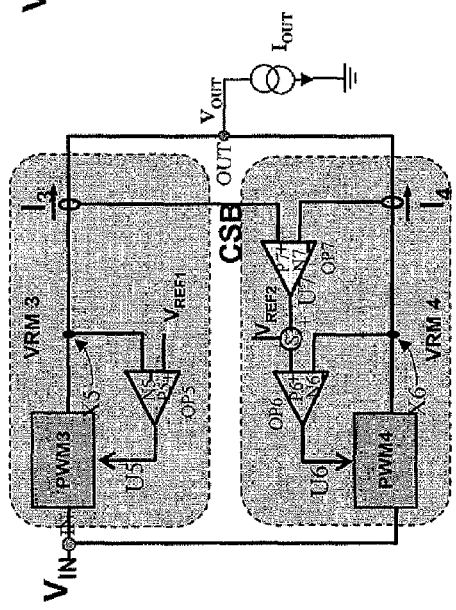
FIG. 4 schematically shows an architecture for implementing a master & slave Direct Master (DM) control method for two parallel modules VRM, realized according to the prior art.
Figure 6:
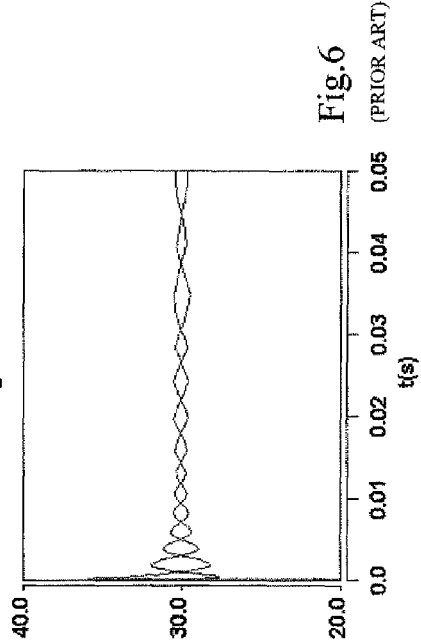
FIG. 6 schematically shows the trend in time of electric values of FIG. 5.
Figures 7, 8:
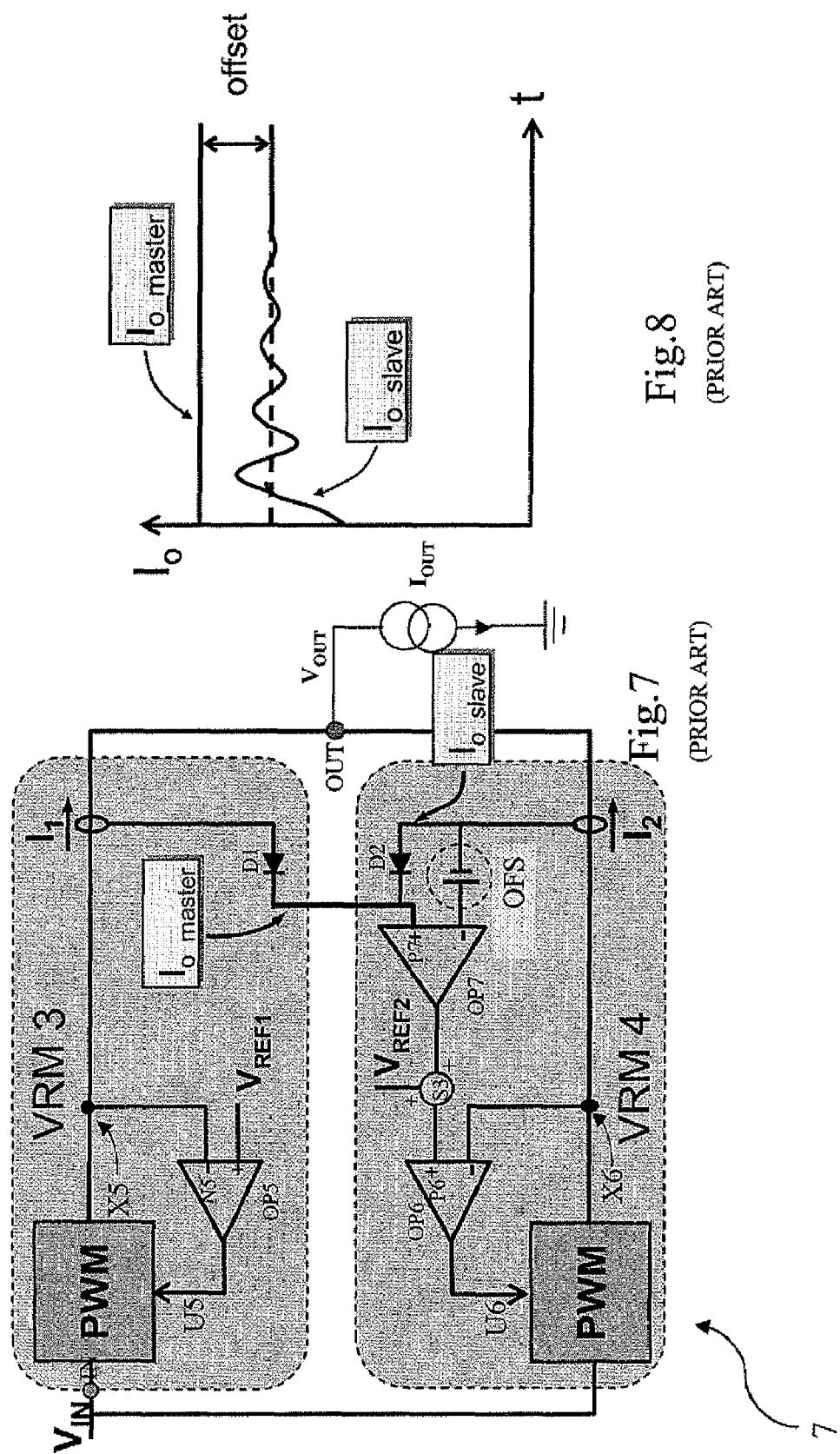
FIG. 7 shows a modified embodiment of the architecture of FIG. 5, according to the prior art.
FIG. 8 shows the trend in time of the electric values of FIG. 7.
Figure 9:
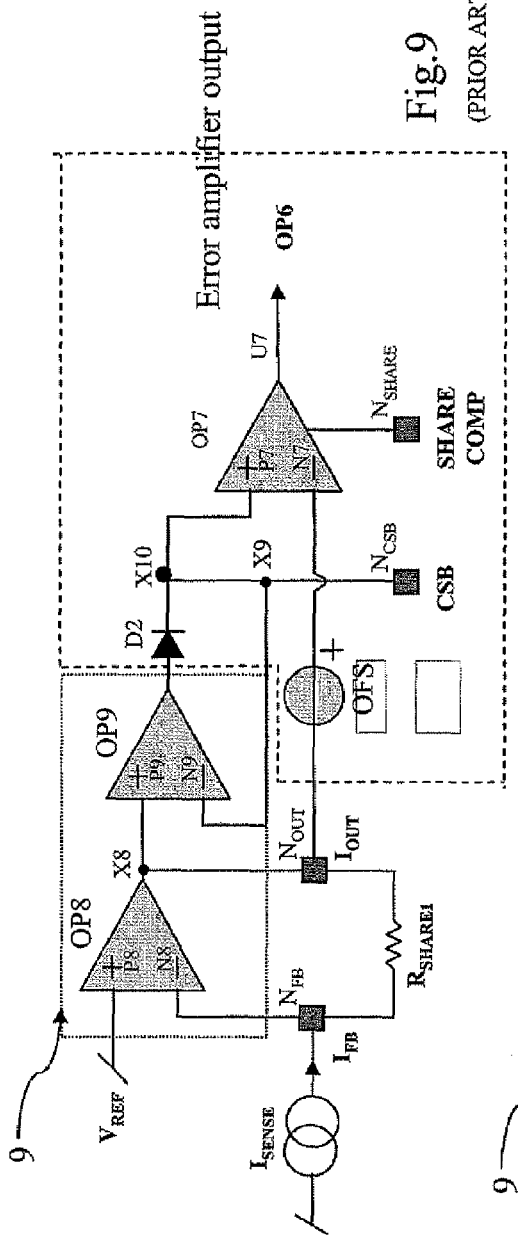
FIG. 9 shows a possible implementation of an integrated circuit of a master & slave Automatic Master (AM) control method, according to the prior art.
Figure 10:
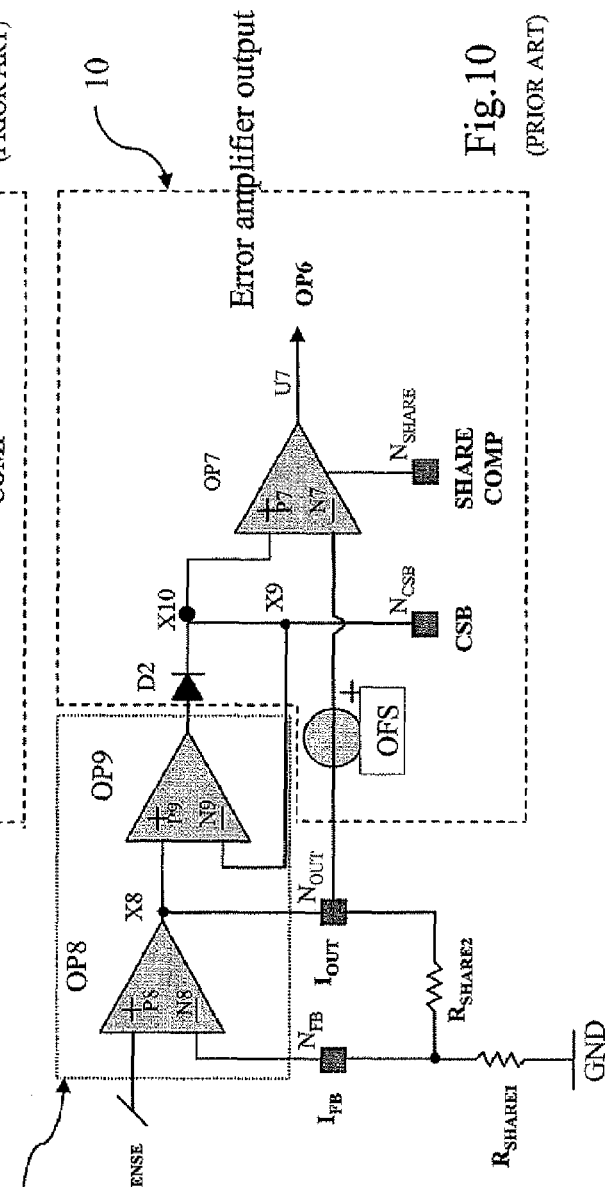
FIG. 10 shows a possible modified embodiment of the implementation of FIG. 9, according to the prior art.

Advantageously, according to the invention, the calculation of the average current value on the CSB occurs under current rather than under voltage, differently from what has been provided in the prior art with reference to FIGS. 1, 2, 3. To this purpose, it is necessary that the current sense signal is just a current, thanks to the insertion, for example, of the pair of current generators $G_{i1}$ and $G_{i2}$ of the module $VRM_i$, shown in FIG. 12 or of the pairs of current generators $G_{11}$, $G_{12}$ and $G_{n1}$, $G_{n2}$ respectively of the modules VRM1 and VRMn, shown in FIG. 11.

In fact, with reference to FIG. 11, by calling $I_k$ the sense current of the general module $VRM_K$, the average voltage on the CSB will be:

$$V_{CSB} = \frac{\sum_{K=1}^{N}(R_{CSB} \cdot I_K)}{N}$$

By changing the expression, and extrapolating the resistor from the summation it results:

$$V_{CSB} = \frac{R_{CSB}}{N} \cdot \sum_{K=1}^{N} I_K$$

An error signal $I_{ERR}$ being useful to control the current Ii of the general module $VRM_i$ will be given from the difference between the current $I_i$ delivered therefrom and the average current I# of all the modules, i.e. the load current (conveniently scaled by the current sense) divided by the number N of modules.

$$I_{ERR} = I_i - \bar{I} = I_i - \frac{\sum_{K=1}^{N} I_K}{N}$$

Consequently, the corresponding error signal under voltage $V_{ERR}$ will be:

$$V_{ERR} = R_i \cdot I_i - \frac{R_{SHARE}}{N} \cdot \sum_{K=1}^{N} I_K$$

Advantageously, according to the invention, the power delivered by the single module VRMi can be programmed.

In fact, the error voltage $V_{ERRi}$ is given by the following formula:

$$V_{ERRi} = V_{SENSEi} - V_{CSB} = R_i \cdot I_i - \frac{R_{CSB}}{N} \cdot \sum_{K=1}^{N} I_K$$

By considering two parallel modules, for example the two modules VRM1 and VRMn, with n=2, of FIG. 11, in the steady condition the error voltage will be almost null and thus:

$$V_{ERR1} = R_1 \cdot I_1 - \frac{R_{CSB}}{2} \cdot (I_1 + I_2) = 0$$

$$V_{ERR2} = R_2 \cdot I_1 - \frac{R_{CSB}}{2} \cdot (I_1 + I_2) = 0$$

Being:

$$I_1 = M \cdot I_{OUT} \Rightarrow I_2 = (1-M) \cdot I_{OUT}$$

where M is the ratio between the current $I_1$ of the module VRM1 and the total load current Iout outputted from the control circuit 21, it results:

$$R_1 = \frac{1}{2 \cdot M} \cdot R_{CSB}$$

$$R_2 = \frac{1}{2 \cdot (1-M)} \cdot R_{CSB}$$

In fact for M=½, i.e. identical currents in the modules it results:

$$R_1 = R_2 = R_{CSB}$$

For a general number N of modules, each resistor $R_i$ of the module i-th, must meet the equation:

$$R_i = \frac{1}{M_i \cdot N} \cdot R_{CSB}$$

where $M_i$ is the percentage of the total system load current Iout delivered only by the i-th module.

Advantageously, according to the invention, the accuracy of the CSB control performed by the control circuit 21 of FIG. 12 comprised in the multi-module architecture 20 is very high since it only depends on the tolerance of the current measure (about 2.5%) and of the external resistor $R_{CSB}$ (<5%).

In fact, by calling $u_R(V_{CSB})$ the relative uncertainty on the voltage $V_{CSB}$ of the Current Sharing Bus, $u_R(I)$ the relative uncertainty of the current sensing Ii of each module VRMi (assumed as being 2.5%) and $u_R(R)$ the one of the external CSB resistor (assumed as being 1%) it results:

$$u_R(V_{CSB}) = \sqrt{u_R^2(I) + u_R^2(R)} \cong 2.7\%$$

Figure 13:
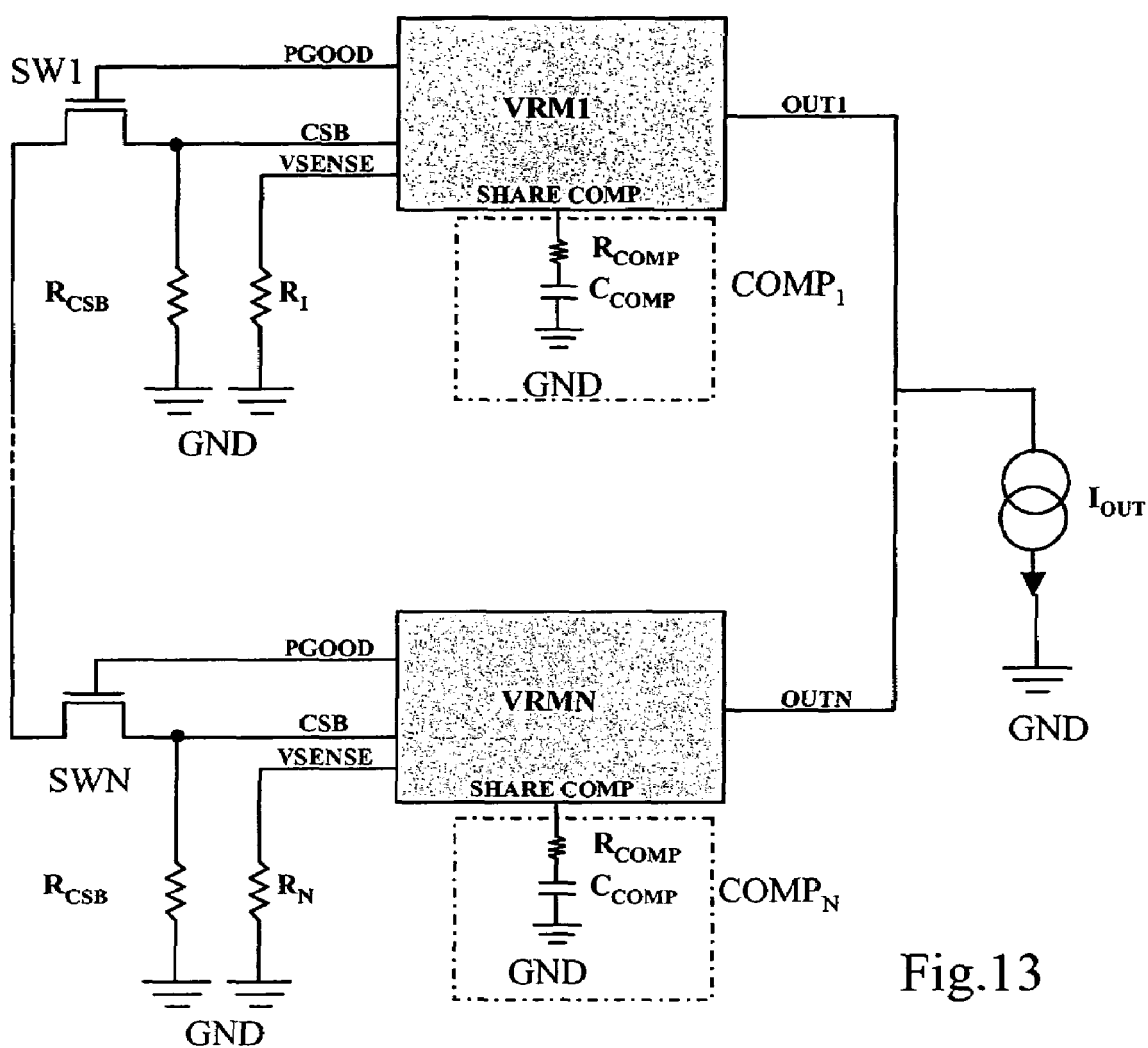
FIG. 13 schematically shows an improvement of the architecture of FIG. 11, according to the present invention.

FIG. 13 shows a multi-module architecture 22, realized as an improvement of the multi-module architecture 20 of FIG. 11, with reference to two modules VRM indicated with VRM1 and VRMN. These modules are fed by a common power supply and they generate outputs OUTi, contributing to determine a current value IOUT outputted from the multi-module architecture 22. Moreover, these modules are connected to compensation blocks COMPi suitable to program the CSB loop band thereof.

Advantageously, according to the invention, a switch SWi is also provided for each module VRMi which, in case of a module fault, disconnect the faulty module from the CSB, in order not to alter the information on the average current of all operating modules. In fact, under this condition, the CSB would program a lower current than the one required by the load and thus the current sharing would fail. The module undergoing the FAULT must therefore be totally disengaged from the system. This effect is obtained by inserting between the CSB and the module VRMi a switch SWi controlled by a signal GOOD monitoring the module correct operation.

The signal GOOD is extracted from the VRMi by means of a pin called Power Good Output (PGOOD), equipping each controller. This pin is an output receiving a low value of the signal GOOD when the controller is out of regulation, and a high value when the module correctly operates and it consequently drives the switch SWi, opening and closing it respectively.

The management of a module FAULT does not require then further pins.

In conclusion, the circuit according to the invention provides for the calculation of the error information, i.e. the difference between the average current of the modules and the one of the single module, directly by means of a current average on the CSB; a very high precision of the voltage carried on the CSB; a programming of the CSB loop band and of the power delivered by the single module; a module fault management by means of a pin already existing in controllers.

That which is claimed is:

1. A signal regulator comprising:
   a plurality of voltage regulator modules; and
   a current sharing bus coupled to said plurality of voltage regulator modules;
   each of said voltage regulator modules comprising
      an operational transconductance amplifier having first and second input terminals,
      a first current generator coupled to the first input terminal, and
      a second current generator directly coupled to the second input terminal,
      said operational transconductance amplifier and first and second current generators defining at least a portion of a control circuit to control said current sharing bus.

2. The signal regulator according to claim 1 further comprising a resistor and a capacitor connected in series and coupled between said operational transconductance amplifier and a voltage reference to program a loop band of the control circuit by increasing a gain of said operational transconductance amplifier at a low frequency and by decreasing the gain at a high frequency.

3. The signal regulator according to claim 1 further comprising a first pin and a second pin respectively associated with the first input terminal and the second input terminal of said operational transconductance amplifier; said first pin being at a same potential as the first pin of other voltage regulator modules.

4. The signal regulator according to claim 3 further comprising:
   a first external resistor between said first pin and a voltage reference; and
   a second external resistor between said second pin and a voltage reference.

5. The signal regulator according to claim 4 further comprising a respective switch coupled to each of said voltage regulator modules to manage fault conditions thereof.

6. A signal regulator comprising:
   a plurality of voltage regulator modules;
   a current sharing bus coupled to said plurality of voltage regulator modules;
   each of said voltage regulator modules comprising
      an operational transconductance amplifier having first and second input terminals,
      a first current generator coupled to the first input terminal of said operational transconductance amplifier, and
      a second current generator coupled to the second input terminal of said operational transconductance amplifier,
      said operational transconductance amplifier and first and second current generators defining at least a portion of a control circuit to control said current sharing bus;
   a resistor and a capacitor connected in series and coupled between said operational transconductance amplifier and a voltage reference to program a loop band of the control circuit by increasing a gain of said operational transconductance amplifier at a low frequency and by decreasing the gain at a high frequency; and
   a first pin and a second pin respectively associated with the first input terminal and the second input terminal of said operational transconductance amplifier;
   said first pin being at a same potential as the first pin of other voltage regulator modules.

7. The signal regulator according to claim 6 further comprising:
   a first external resistor between said first pin and a voltage reference; and
   a second external resistor between said second pin and a voltage reference.

8. The signal regulator according to claim 7 further comprising a respective switch coupled to each of said voltage regulator modules to manage fault conditions thereof.

9. A method for making a signal regulator comprising:
forming a plurality of voltage regulator modules with a current sharing bus coupled therebetween; and
forming a control circuit for the current sharing bus by forming each of the voltage regulator modules to include an operational transconductance amplifier having first and second input terminals,
a first current generator coupled to the first input terminal of the operational transconductance amplifier, and
a second current generator directly coupled to the second input terminal of the operational transconductance amplifier.

10. The method according to claim 9 further comprising forming a resistor and a capacitor in series and coupling the resistor and the capacitor between the operational transconductance amplifier and a voltage reference to program a loop band of the control circuit by increasing a gain of the operational transconductance amplifier at a low frequency and by decreasing the gain at a high frequency.

11. The method according to claim 9 further comprising associating a first pin and a second pin respectively with the first input terminal and the second input terminal of the operational transconductance amplifier; the first pin being at a same potential as the first pin of other voltage regulator modules.

12. The method according to claim 11 further comprising:
coupling a first external resistor between the first pin and a voltage reference; and
coupling a second external resistor between the second pin and a voltage reference.

13. The method according to claim 12 further comprising forming a respective switch to each of the voltage regulator modules to manage fault conditions thereof.

* * * * *